(12) United States Patent
Vandayburg

(10) Patent No.: US 8,877,137 B2
(45) Date of Patent: Nov. 4, 2014

(54) HYDROGEN GENERATOR

(71) Applicant: Intelligent Energy Inc., Long Beach, CA (US)

(72) Inventor: Mark D. Vandayburg, Westlake, OH (US)

(73) Assignee: Intelligent Energy Inc., San Jose, CA (US)

( * ) Notice: Subject to any disclaimer, the term of this patent is extended or adjusted under 35 U.S.C. 154(b) by 148 days.

(21) Appl. No.: 13/692,152

(22) Filed: Dec. 3, 2012

(65) Prior Publication Data

US 2014/0154596 A1 Jun. 5, 2014

(51) Int. Cl.

| | |
|---|---|
| *C25B 1/02* | (2006.01) |
| *C01B 3/02* | (2006.01) |
| *B01J 19/00* | (2006.01) |
| *H01M 8/06* | (2006.01) |
| *C01B 3/00* | (2006.01) |
| *C01B 3/04* | (2006.01) |
| *B01J 19/24* | (2006.01) |
| *C01B 3/06* | (2006.01) |

(52) U.S. Cl.
CPC ............ *B01J 19/24* (2013.01); *H01M 8/0606* (2013.01); *C01B 3/001* (2013.01); *C01B 3/04* (2013.01); *C01B 3/065* (2013.01); *C01B 3/06* (2013.01)
USPC ........ 422/198; 422/199; 422/164; 423/658.2; 205/637

(58) Field of Classification Search
USPC ............... 205/637–639; 204/193–296.16; 422/164–166, 219, 221, 236, 238, 239, 422/198–199; 423/648.1, 658.2
See application file for complete search history.

(56) References Cited

U.S. PATENT DOCUMENTS

| | | | |
|---|---|---|---|
| 6,979,805 B2 | 12/2005 | Arthur et al. | |
| 7,731,491 B2 | 6/2010 | Mann et al. | |
| 8,084,150 B2 | 12/2011 | Otis, Jr. et al. | |
| 8,137,627 B2 | 3/2012 | Horiguchi et al. | |
| 2009/0078345 A1 | 3/2009 | Kellett et al. | |
| 2010/0018764 A1 | 1/2010 | Rangsten et al. | |
| 2013/0108940 A1* | 5/2013 | Langan et al. | 429/426 |
| 2014/0044605 A1* | 2/2014 | Langan et al. | 422/198 |
| 2014/0137562 A1* | 5/2014 | Law et al. | 60/772 |

FOREIGN PATENT DOCUMENTS

| | | |
|---|---|---|
| FR | 2957911 A1 | 9/2011 |
| WO | 2008017793 A2 | 2/2008 |
| WO | 2008140618 A1 | 11/2008 |

\* cited by examiner

*Primary Examiner* — Nicholas A Smith
*Assistant Examiner* — Brian W Cohen
(74) *Attorney, Agent, or Firm* — Baker and Hostetler LLP

(57) ABSTRACT

A hydrogen generator including an initiator assembly having one or more contact members within a compressible member, and a removable fuel unit adjacent a surface of the compressible member. The fuel unit contains a hydrogen containing material that can release hydrogen gas when heated and an exothermic mixture that can react exothermically upon initiation by the initiator assembly. When no fuel unit is in the hydrogen generator, the compressible member is uncompressed and the contact members are at or below its surface, and when a fuel unit is disposed in the hydrogen generator, the compressible member is compressed so the contact members extend beyond the surface to make thermal contact with the fuel unit. Energy from the initiator assembly is conducted by the contact members to corresponding quantities of the exothermic mixture to initiate an exothermic reaction, providing heat for the release of hydrogen gas from the hydrogen containing material.

20 Claims, 2 Drawing Sheets

HYDROGEN GENERATOR

TECHNICAL FIELD

This invention relates to a hydrogen generator for producing hydrogen gas, particularly for providing hydrogen gas to a hydrogen consuming device such as a fuel cell battery.

BACKGROUND

Gas generators are used to produce a variety of gases for various purposes. Examples include hydrogen, oxygen, carbon monoxide and carbon dioxide generators. Hydrogen generators are of particular interest because they can be used to provide hydrogen gas that is used as an active material in a fuel cell battery.

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (such as in a fuel cell stack), and a gas source, such as a gas tank or a gas generator. Gas generators that supply gas to a fuel cell can be an integral part of a fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

Hydrogen generators can produce hydrogen using a variety of reactants and a variety of methods for initiating the hydrogen generating reactants. Hydrogen gas can be evolved when a hydrogen containing material reacts.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

Some hydrogen containing compounds can be heated to evolve hydrogen in a chemical decomposition reaction. Such thermal decomposition reactions, such as those of hydrides, can be advantageous over hydrolysis reactions because the yield of hydrogen is greater, it does not produce steam vapor that may have to be removed from the hydrogen gas, and freezing is not a concern.

In some systems using gas produced by a gas generator, it is desirable to produce the gas on an as-needed basis, thereby minimizing the need (and the volume) to store a large quantity of gas until needed. It can also be desirable to provide the reactants for the gas generator in a replaceable, low cost form. It can also be desirable to operate the gas generator at a low cost, with a minimum amount of energy required.

In view of the above, an object of the present invention is to provide a hydrogen generator that is easy and economical to manufacture and operate, has a user replaceable fuel unit containing a minimum number of components, requires minimal cleaning by the user, and can provide hydrogen gas in limited quantities as needed.

SUMMARY

The above objects are met and the above disadvantages of the prior art are overcome by a hydrogen generator and a fuel cell system including a fuel cell battery and a hydrogen generator as described herein.

Accordingly, one aspect of the present invention is a hydrogen generator including: a housing including an access panel; an initiator assembly disposed in the housing and including one or more contact members; a compressible member having opposing first and second surfaces and within which the one or more contact members are disposed; and a fuel unit removably disposed in the housing adjacent the first surface of the compressible member, the fuel unit containing a hydrogen containing material that can release hydrogen gas when heated and an exothermic mixture that can react exothermically upon initiation by energy from the initiator assembly. When no fuel unit is disposed in the hydrogen generator, the compressible member is uncompressed, and the one or more contact members are at or below the second surface; and when a fuel unit is disposed in the hydrogen generator, the compressible member is compressed such that the one or more contact members extend beyond the second surface to make thermal contact with the fuel unit. Energy from the initiator assembly is conducted by the one or more contact members to corresponding one or more quantities of the exothermic mixture to initiate an exothermic reaction therein, thereby providing heat for the release of hydrogen gas from the hydrogen containing material. Embodiments can include any of the following, alone or in combination:

the hydrogen generator includes a plurality of contact members, each corresponding to one or a group of a plurality of segregated quantities of the exothermic mixture; an exothermic reaction in each one or group of the plurality of quantities of the exothermic mixture can be selectively initiated via the corresponding contact member;

the initiator assembly includes one or more heating elements, each in thermal communication with at least one corresponding contact member such that the corresponding contact members can conduct heat from one of the heating elements to the corresponding one or more quantities of the exothermic mixture;

the initiator assembly conducts electrical energy through the one or more contact members, each of which conducts electrical energy to one or more corresponding quantities of the exothermic mixture;

the fuel unit includes a plurality of quantities of the exothermic mixture, each capable of providing heat for the release of hydrogen gas from a portion of the hydrogen containing material; the portions of the hydrogen containing material can be segregated portions; the segregated portions of the hydrogen containing material can be segregated by any one or a combination of a gap, a thermal insulator member and an electrical insulator member; the exothermic reaction in individual or groups of quantities of the exothermic mixture can be selectively initiated to selectively provide energy to one or more conductor members, each of which conducts energy to one or more of the plurality of quantities of the exothermic mixture;

each of the contact members is a heating element;

each of the contact members has an end for contacting the fuel unit; each of the contact members can have an elongated body; the end can be a tapered tip; the tip can penetrate into the fuel unit;

energy is provided to the initiator assembly from an energy source;

the compressible member includes hydrogen flow channels in its first surface; and the access panel is moveable to provide access to the hydrogen generator for insertion and removal of the fuel unit; the access panel can be removable from the remainder of the housing; the access panel can be a hinged panel that remains attached to the remainder of the housing.

A second aspect of the invention is a fuel cell system including a fuel cell battery and a hydrogen generator as described above. Embodiments can include any of the following, alone or in combination:

the fuel cell system includes a controller to selectively provide energy to one or more conductor members; each of the one or more conductor members can conduct energy to one or more of a plurality of quantities of the exothermic mixture; the controller can selectively provide energy to one or more conductor members based one or more parameters of the fuel unit, the hydrogen generator and a hydrogen consuming device; and the fuel cell system includes an energy source that is external with respect to the fuel unit; the energy source can be external with respect to the hydrogen generator.

A third aspect of the invention is a method of generating hydrogen gas. The method includes the steps: (a) providing a hydrogen generator including a housing with an access panel, an initiator assembly disposed in the housing and including one or more contact members, a compressible member having opposing first and second surfaces and within which the one or more contact members are disposed, and a fuel unit removably disposed in the housing adjacent the second surface of the compressible member, the fuel unit containing a hydrogen containing material that can release hydrogen gas when heated and an exothermic mixture that can react exothermically upon initiation by energy from the initiator assembly; (b) disposing the fuel unit within the housing; (c) securing the panel to enclose the fuel unit within the housing, thereby pushing the fuel unit against the first surface of the compressible pad to compress the pad and extend ends of the contact members from the surface of the compressible pad to contact the fuel unit; (d) supplying energy to at least one of the contact members and conducting the energy to a corresponding quantity of the exothermic mixture to initiate an exothermic reaction in the quantity of exothermic material; and (e) conducting heat from the exothermic reaction to a corresponding portion of the hydrogen containing material to cause a release of hydrogen gas. Embodiments can include any of the following, alone or in combination:

the hydrogen generator includes one or more of the features of the first aspect of the invention disclosed above;

the fuel unit is removed from the hydrogen generator, and steps (b) through (e) are repeated using another fuel unit;

These and other features, advantages and objects of the present invention will be further understood and appreciated by those skilled in the art by reference to the following specification, claims and appended drawings.

Unless otherwise specified, the following definitions and methods are used herein:

"corresponding" means in thermal or electrical communication with;

an electrical insulator or electrically nonconductive material or structure is a material or structure with poor electrical conductivity, the electrical conductivity at 293° K being less than $10^{-10}$ ohm$^{-1}$·meter$^{-1}$;

a thermally conductive material or structure is a material or structure with good thermal conductivity, the thermal conductivity being greater than 100 watts/meter·Kelvin; and a thermal insulator or thermally nonconductive material or structure is a material or structure with poor thermal conductivity, the thermal conductivity being less than 5 watts/meter·Kelvin, preferably less than 2 watt/meter·Kelvin and most preferably less than 1 watt/meter·Kelvin).

Unless otherwise specified herein, all disclosed characteristics and ranges are as determined at room temperature (20-25° C.).

DESCRIPTION

Figure 1:
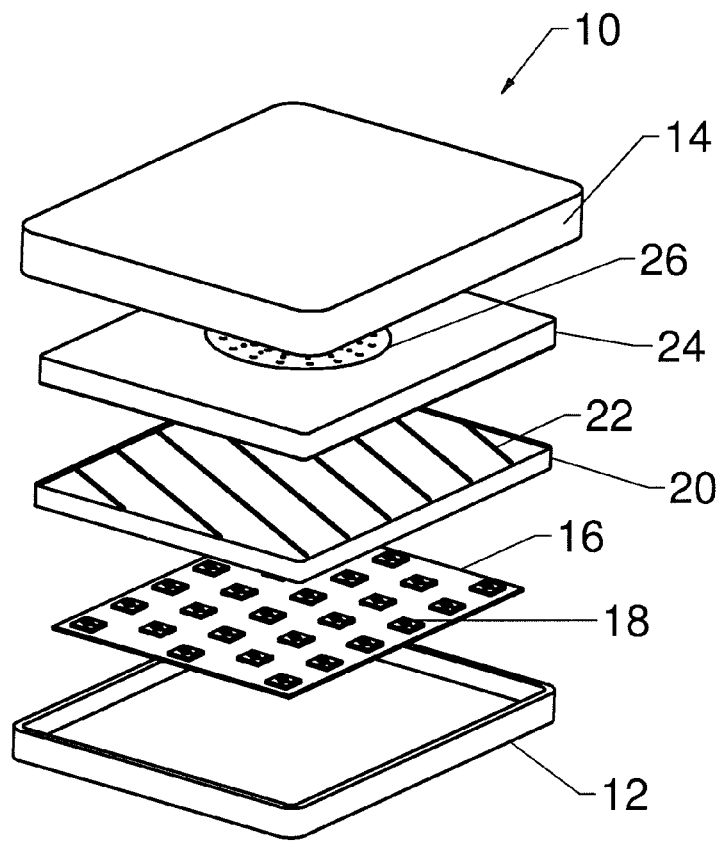
FIG. 1 is an exploded perspective view of an embodiment of a hydrogen generator.

An embodiment of the invention is a hydrogen generator with a replaceable fuel unit that can produce hydrogen gas; e.g., for a hydrogen gas consuming device. For example, the hydrogen generator can be part of a fuel cell system to supply the hydrogen gas as a fuel for a fuel cell battery. The fuel cell system can be an integral part of an electric appliance that can be powered and/or recharged by the fuel cell battery, or the fuel cell system can be a separate device that can be connected to the electric appliance. Examples of appliances that can be supplied with power by a fuel cell system using hydrogen produced by a hydrogen generator include communications devices such as cellular telephones and smart phones; computers such as laptop and notebook computers, navigational systems such as global positioning systems, book readers, and others, particularly those with thin profiles.

The hydrogen generator includes a housing and an initiator assembly disposed in the housing for heating a fuel unit. The fuel unit is a removable fuel unit that can be replaced after use with one containing fresh fuel, and the housing includes an access panel that can be opened or removed to allow replacement of a spent fuel unit with a fresh one. In this way fuel units, which contain primarily consumable materials, can be replaced after use, while the remainder of the hydrogen generator can be reused many times, making the generation of hydrogen gas more economical than if the entire hydrogen generator had to be replaced.

The fuel unit contains a hydrogen containing material that can release hydrogen gas when heated, as well as an exothermic mixture. The initiator assembly is used to provide sufficient energy (e.g., thermal or electrical) to initiate an exothermic reaction in the exothermic mixture, and the exothermic reaction provides sufficient heat to cause the release of the hydrogen gas from the hydrogen containing material. By using an exothermic mixture to provide most of the heat required to generate hydrogen gas, the energy requirements from outside the fuel unit are minimized, since the initiator assembly must only provide energy for only short periods of time, sufficient only for the initiation of the exothermic reaction.

Energy is conducted from the initiator assembly to the fuel unit by one or more contact members to one or more corresponding quantities of the exothermic mixture. The contact members are disposed within a compressible member. When no fuel unit is present in the hydrogen generator, the compressible member is uncompressed such that the contact member(s) do not extend beyond the surface of the compressible member adjacent to the fuel unit. When a fuel unit is present, the compressible member is compressed such that the contact members extend beyond the surface of the compressible member to make thermal or electrical contact with the fuel unit. The compressible member provides pressure against the fuel unit to hold in firmly in place, and it also protects the unexposed contact members from damage when no fuel unit is installed in the hydrogen generator. The compressible member can also help keep the contact members clean, e.g., by wiping foreign material from their surfaces as compressive force against the compressible member is removed and the ends of the thermal contact members retract below the surface of the compressible member.

In various embodiments the hydrogen generator can include multiple quantities of the exothermic mixture, each positioned within the fuel unit to provide the heat necessary to release essentially all of the hydrogen gas from a corresponding portion of the hydrogen containing material. Individual quantities of the exothermic material, or groups thereof, can correspond to one or more contact members, such that energy can be conducted by the contact members to selectively initiate an exothermic reaction in the corresponding individual or groups of quantities of exothermic material. This allows for the release of hydrogen gas from either a single portion or multiple portions of the hydrogen containing material during a given period of time. Hydrogen gas can thereby be generated as needed by the hydrogen consuming device, without creating a high pressure within the hydrogen generator or the hydrogen consuming device. Selectively providing energy can also limit the maximum temperature within the fuel unit and the hydrogen generator. Selective initiation of quantities of the exothermic mixture can be controlled in various ways, such as by the use of a controller, located in or outside the hydrogen generator, based on one or more parameters of the fuel unit, the hydrogen generator and the hydrogen consuming device for example. Additional embodiments of the hydrogen generator are disclosed in further detail below.

The hydrogen generator housing can be a part of a hydrogen consuming device such as a fuel cell system, or it can be a separate apparatus, that can be connected to or installed in a hydrogen consuming device for example. The access panel can be a removable portion of the housing, such as a removable section of a housing wall, or it can be a panel that remains attached to the remainder of the housing, such as a hinged door. The housing can also include an interlock mechanism that prevents the user from opening or removing the access panel when an internal temperature (e.g., the air, fuel unit or other component) of the hydrogen generator is above a predetermined level.

The housing can be made of a material that sturdy and withstand the heat produced. Metals such as aluminum, steel and stainless steel, ceramics, and high temperature resistant polymers such as polyphenylene sulfide, acrylonitrile butadiene styrene, polyetheretherketone, polyetherimide, polyoxybenzylmethyleneglycol anhydride (Bakelite®), epoxies, phenolics, diallyl phthalate and melamine may generally be suitable for the hydrogen generator housing. Thermal insulation may be desirable to protect the user and external materials and structures from damage due to heat from within the hydrogen generator. In such cases, the housing can be made of a material that is a poor thermal conductor, or thermal insulators can be added. When poor thermal conductivity is required, the material will have a thermal conductivity less than 5 watts/meter·Kelvin, preferably less than 2 watt/meter·Kelvin and most preferably less than 1 watt/meter·Kelvin). Walls of the housing can also include a cavity to provide thermal insulation; the cavity can contain a vacuum to improve the thermal insulating property of the wall.

The compressible member can be compressed by securing the access panel to the housing (e.g., by closing the access panel) with the fuel unit in the housing, thereby applying force against the fuel unit and the first surface compressible member to compress the compressible member. As the compressible member is compressed, the ends of the contact members, which are supported at their opposite ends, proximate to the second surface of the compressible member, remain in place so that they extend beyond the first surface of the compressible member and make contact with the fuel unit and corresponding quantities of the exothermic mixture. The extended ends of the contact members can penetrate through external packaging of the fuel unit to make good thermal or electrical contact with the exothermic material.

The compressible member can be made of a resilient material that will recover to substantially its original thickness after each compression. Preferably the material will be a poor thermal and electrical conductor. Materials that may be suitable include natural and artificial sponge materials and cured, cross-linked or vulcanized elastomers, with a quick recovery and a low creep. Examples include one or more of a polyurethane elastomer, a polychloroprene (neoprene), polybutadiene, chloro isobutylene isoprene, chlorosulphonated polyethylene, epichlorohydrin, ethylene propylene, ethylene propylene diene monomer, ethylene vinyl acetate, hydrogenated nitrile butadiene, polyisoprene, isoprene butylenes (butyl), butadiene acrylonitrile, (e.g., BUNA-N™ from Ashtabula Rubber Co.), styrene butadiene, (e.g., BUNA S™ from Ashtabula Rubber Co.), fluororelastomers (e.g., VITON® and KALREZ® from DuPont), and silicone. In an embodiment the material can have a compressive force in the range of 4.4 to 8.9 newtons and a firmness in the range 0.4 to 1.4 psi for 25% compression. The material may have a compression range of about 10 to 15% and may be capable of die cut blanking. The material can further include suitable tensile strength, shear strength, stretch limit and density. To allow hydrogen gas that is generated to easily escape from the fuel unit, the compressible pad material can have open pores or other hydrogen flow paths (e.g., holes, channels or grooves) formed therein.

The contact members can be merely thermal or electrical conductors for conducting heat or electricity, or they may be heating elements that convert electrical energy to thermal energy. If they are just conductors, they will have good thermal and/or electrical conductivity and preferably be in direct contact with electrical contacts or heating elements in the housing, at least when a fuel unit is in the hydrogen generator and the compressible member is compressed. The contact members will have sufficient strength and stability to withstand the forces and environment to which they will be exposed. The shape of the contact members will preferably facilitate extension from and retraction to within the compressible member when the compressible member is compressed and uncompressed. Preferably the contact members will have a relatively small cross-sectional dimension in a plane parallel to the surface of the pad adjacent to the fuel unit, such as a round or prismatic cylindrical shape. The contact members can have ends that are tapered, e.g., to a blunt or sharp point. In some embodiments the contact members can penetrate the fuel unit when the pad is compressed against the fuel unit, thereby allowing heat to be conducted into the fuel unit and not just to its surface.

Heating elements can be of any suitable type, such as a resistive heating element. Energy (e.g., electric current) to operate the heating elements or to directly initiate the exothermic reactions is provided from one or more energy sources. Examples of energy sources include a primary battery, a secondary battery, a fuel cell, a capacitor and a public utility. The energy source is preferably disposed external to the fuel unit, within or outside the hydrogen generator. If the initiator assembly includes heating elements that are separate from the contact members, they can be disposed on or adjacent to a surface of the compressible member opposite the surface adjacent to the fuel unit. If the exothermic reaction is initiated by electrical energy or the heating elements are the contact members, leads (e.g., electrical leads) connected to the energy source can provide electrical energy (e.g., electric current) to the contact members (e.g., to ends of the contact members at the compressible member surface opposite the fuel unit).

The fuel unit contains an exothermic mixture that includes one or more reactants that will react exothermically when provided with sufficient thermal or electrical energy. Preferably the exothermic mixture will also produce hydrogen gas during the exothermic reaction. This hydrogen gas contributes to the total amount of hydrogen gas that is produced by the hydrogen generator. Preferably the amount of energy required to initiate the exothermic reaction is small. The exothermic mixture contains reactants that react following initiation in a self-sustaining exothermic reaction. Examples of suitable reactants include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. *Chem. Eng. Sci* 2010, 65, 80-87 and *Int. J. Hydrogen En* 2007, 32, 207-211, respectively). The exothermic mixture can include one or more additives, to serve as a binder or to slow down the exothermic reaction (e.g., to prevent it from getting too hot or from being consumed before the corresponding quantity of hydrogen containing material can be fully utilized) for example.

The hydrogen containing material is preferably a material that, when heated, reacts endothermically (or at least not exothermically enough to be self-sustaining) to release hydrogen gas. One or a combination of materials can be used. Examples include materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. A preferred hydrogen containing material is alane, which decomposes to aluminum metal and hydrogen gas at about 180° C. Alane has a density of about 1.3 $g/cm^3$, and a composition including 10 weight percent binder can produce about 9 weight percent hydrogen gas. The hydrogen containing material can be part of a fuel mixture with various additives, such as binders, stabilizing compounds, thermally conduction materials, flow agents and catalysts.

The fuel mixture can be present as a single mass within the fuel unit, or it can be in segregated quantities, separate from the remainder of the fuel mixture by one or a combination of gaps and dividers, such as thermal insulators. The exothermic mixture is positioned on or within the fuel mixture such that each quantity of exothermic mixture can provide the heat necessary to cause the release of hydrogen gas from a portion of the fuel mixture. Each quantity of exothermic mixture will tend to be effective in causing the release of hydrogen gas in that portion of the fuel mixture in closest proximity. To maximize the efficiency of the fuel unit (provide the maximum amount of hydrogen gas), it may be advantageous to separate the fuel mixture into segregated quantities so that each quantity of exothermic mixture will cause the release of hydrogen gas from only the corresponding portion (segregated quantity) of fuel mixture and insure essentially 100 percent utilization of the hydrogen containing material in that segregated quantity. Accordingly, it is advantageous to locate and size the quantities of exothermic mixture in a manner that there are sufficient amounts of the exothermic mixture in the appropriate locations to maximize the amount of hydrogen gas released, while minimizing the total quantity of exothermic mixture in the fuel unit. The exothermic mixture can be disposed only on the surface of the fuel unit in contact with the contact members, or, preferably, quantities of the exothermic mixture can extend into the bulk of the fuel unit to minimize heat loss from the fuel unit and thereby maximize heating efficiency.

The fuel unit can be enclosed by a package. The package can protect the fuel mixture and exothermic mixture from the surrounding environment during transportation and storage of the fuel unit before use, contain the fuel mixture and exothermic mixture within the fuel unit before use and contain reaction products within the fuel unit during and after use, thereby assuring a high yield of hydrogen gas, keeping the inside of the hydrogen generator clean, and preventing contact between contents of the packaged fuel unit and users or anything outside the hydrogen generator.

The fuel unit package can be made of a poor electrically and thermally conductive material to prevent energy from one contact member or one quantity of exothermic mixture from unintentionally initiating an exothermic reaction in another quantity of exothermic mixture. The contact members can penetrate through the package to make electrical or thermal contact with corresponding quantities of exothermic mixture, or the package can include conductive sections that conduct electrical or thermal energy from the contact members to corresponding quantities of the exothermic mixture. For example, the package can include a layer of nonconductive material. The package can also include apertures (e.g., windows) in the nonconductive material covered by sections of conductive material. Examples of nonconductive materials that may be suitable include flexible glasses and high temperature polymers, having a heat distortion temperature (deflection temperature under load) (per ASTM D648 at 18.56 kg/cm$^2$ (264 psi)) greater than the maximum temperature which the material is intended to withstand. An example of a flexible glass is Corning Willow Glass from Corning, Inc. Examples of high temperature polymers include polyetheretherketone, polyimides, phenolics and derivatives thereof. Examples of conductive material that can be used include metal foils (e.g., of aluminum, steel, stainless steel, copper, nickel and alloys thereof) and non-metallic materials (e.g., graphite based materials such as GRAFOIL®, made by GrafTech).

A control system can be used to supply energy to the initiator assembly, control the rate and amount of gas generated, or control the gas flow rate from the hydrogen generator for example. In a fuel cell system, the control system can determine the need for hydrogen and/or the required hydrogen flow rate by monitoring the pressure within the fuel cell system, one or more electrical characteristics of a fuel cell, or one or more electrical characteristics of an electronic device being powered by the fuel cell system for example. The control system may communicate with the device or the fuel cell system to determine when more hydrogen is needed. The control system can be completely or partially disposed in the hydrogen generator, the fuel cell battery, the electronic device being powered by the fuel cell battery, or any combination thereof. The control system can include a microprocessor, controller or micro controller; digital, analog and/or hybrid circuitry; solid state and/or electromechanical switching devices; capacitors, sensing instrumentation, timers, DC-DC converters, and so on. The same or a different control system can also be used for other purposes, such as identifying hydrogen generators and fuel units that are appropriate or approved for use, preventing use of inappropriate or unapproved hydrogen generators and fuel units, controlling charging of batteries in the fuel cell system and the device by the fuel cell battery, calculating and providing information on the remaining capacity of the fuel unit(s), recording historical information regarding the use of fuel units, the hydrogen generator, the fuel cell system and the device, preventing operation of the hydrogen generator under unsafe conditions, and other purposes.

A schematic representation of a hydrogen generator is shown in an exploded perspective view in FIG. 1. The hydrogen generator 10 has a housing including a first housing member 12 and a second housing member (access panel) 14. The housing also includes a hydrogen gas outlet (not shown) through which hydrogen gas can be released (e.g., to a hydrogen consuming device). An initiator assembly 16 including a plurality of heating elements 18 is disposed in the housing, and a compressible member 20 is disposed against the initiator assembly 16, with the heating elements 18 in contact with ends of contact members 28 (FIGS. 3 and 4) exposed on the bottom surface of the compressible member 20. The heating elements are connected via an electrical circuit (not shown) to an energy source (not shown) that provides energy for operation of the initiator assembly. The compressible member 20 can include optional hydrogen flow paths 22 in the surface disposed against the adjacent fuel unit 24. The fuel unit 24 can be enclosed in a package, and the package can include escape means 26 such as perforations, slits and the like for hydrogen gas produced within the package to escape. Although the initiator assembly 16 is shown in FIG. 1 as including heating elements 18, in other embodiments the contact members 28 can be heating elements, with the plurality of heating elements 18 being replaced by a plurality of electrical contacts for conducting energy to the contact members/heating elements 28.

Figure 2:
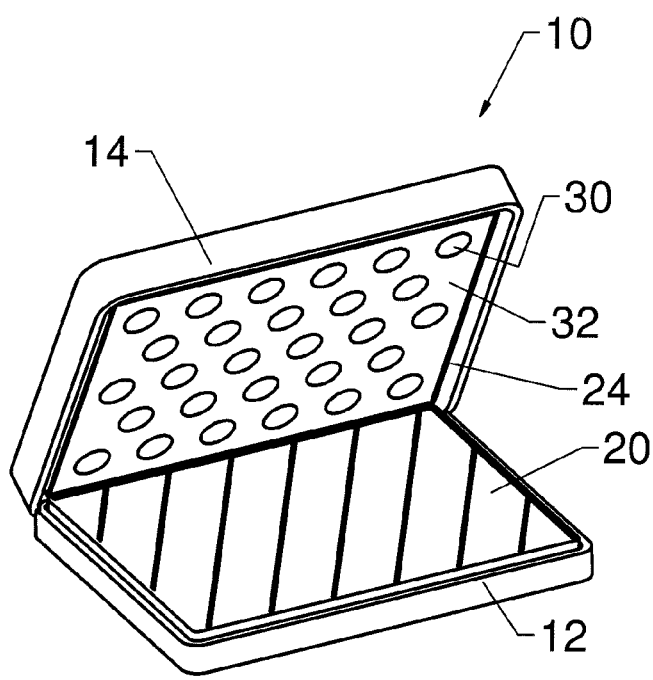
FIG. 2 is a perspective view of the hydrogen generator in FIG. 1, with components assembled into either a top or bottom housing member.

FIG. 2 shown the hydrogen generator 10 with the compressible member 20 disposed in the first housing member 12 and the fuel unit 24 disposed in the second housing member 14. The first and second housing members 12, 14 can be hinged as shown in FIG. 2, or they can be arranged differently, as disclosed above. The fuel unit 24 is shown in FIG. 2 with the portion of its packaging facing the compressible member 20 removed to show a plurality of quantities of exothermic mixture 30 disposed in a fuel mixture 32 within the fuel unit 24.

Figure 3:
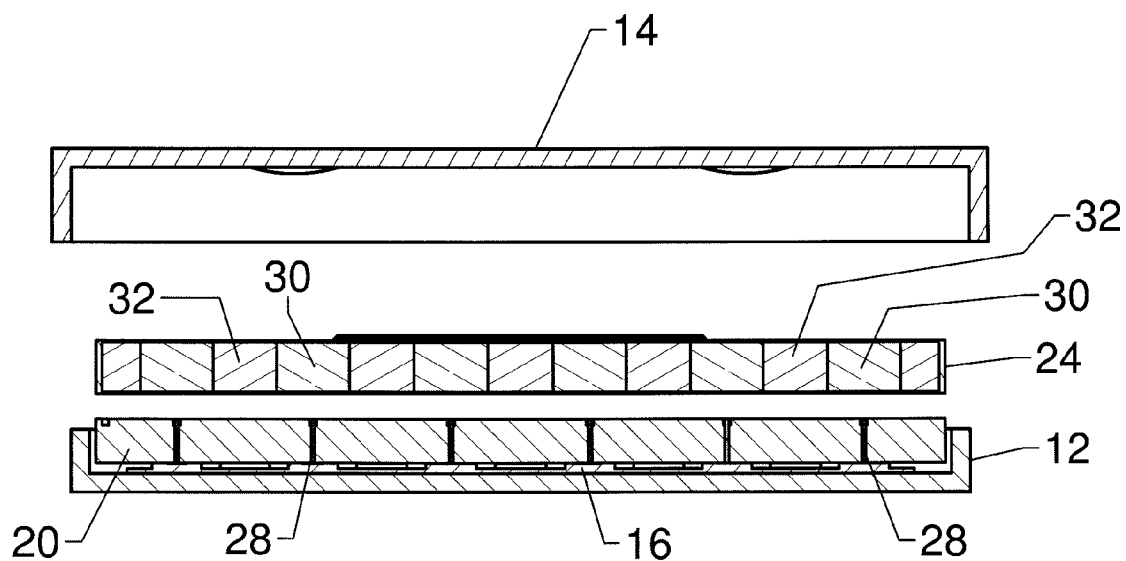
FIG. 3 is a cross-sectional view of the hydrogen generator in FIG. 1, with an open housing and uncompressed compressible member.

In FIG. 3 the hydrogen generator 10 is shown with the housing 12, 14 open and the compressible member 20 uncompressed so that the ends of the contact members 28 opposite the heating elements 18 are not exposed at the surface of the compressible member 20 facing the fuel unit 24. The fuel unit 24 is shown disposed against the compressible member 20 to show alignment of the contact members 28 with corresponding quantities of exothermic mixture 30.

Figure 4:
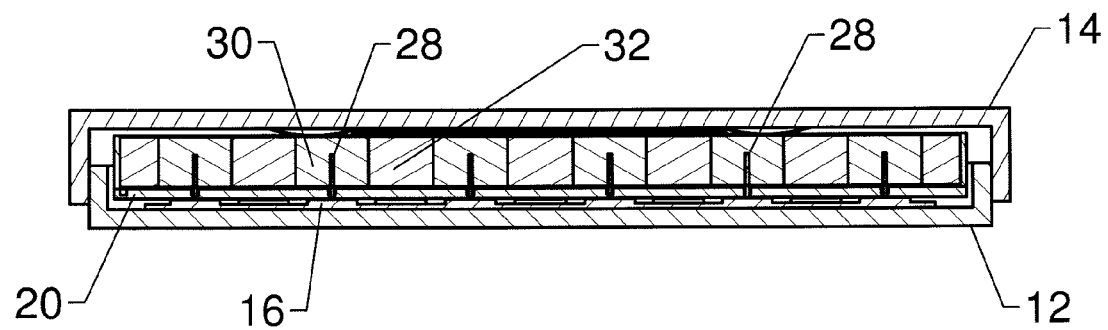
FIG. 4 is a cross-sectional view of the hydrogen generator in FIG. 1, with a closed housing and compressed compressible member.

In FIG. 4 the hydrogen generator is shown with the housing 12, 14 closed and the compressible member 20 compressed, with the ends of the contact members 28 penetrating through the fuel unit package and into the corresponding quantities of exothermic mixture 30. Thus, when the hydrogen generator 10 is closed, with a fuel unit 24 installed therein, and energy is supplied to one or more heating elements 18, heat from the heating element(s) is conducted by the corresponding contact members 28 through the fuel unit package and to the corresponding quantities of exothermic mixture 30, to initiate an exothermic reaction in the exothermic mixture 30 and provide the necessary heat to cause a release of hydrogen gas from the corresponding portions of the fuel mixture 32. The hydrogen gas released can escape the fuel unit 24, e.g., through perforations in the package made by the penetrating contact members 24 and/or through other hydrogen escape means 26 in the package. The release of hydrogen gas from selected portions of the fuel unit 24 can be controlled by selectively providing energy to individual heating elements 18, thereby providing limited quantities of hydrogen gas on an as needed basis.

FIGS. 1 to 4 are schematic representations of an embodiment of a hydrogen generator. A person skilled in the art will be readily able to make modifications, as described above. For example, the size and shape of the hydrogen generator and its components can be varied, the contact members can function as heating elements rather than just thermal conductors, the disposition of the exothermic mixture within the fuel unit can be varied, the composition of the fuel unit package can be varied, the fuel mixture can be in a single mass or separated into segregated quantities, the method of opening and closing the fuel unit package can be varied, and various means can be provided to controlling the release of hydrogen gas from the hydrogen generator or connecting the hydrogen generator to a hydrogen consuming device.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
   a housing including an access panel;
   an initiator assembly disposed in the housing and including one or more contact members;
   a compressible member having opposing first and second surfaces and within which the one or more contact members are disposed; and
   a fuel unit removably disposed in the housing adjacent the first surface of the compressible member, the fuel unit containing a hydrogen containing material that can release hydrogen gas when heated and an exothermic mixture that can react exothermically upon initiation by energy from the initiator assembly;
   wherein:
   when no fuel unit is disposed in the hydrogen generator, the compressible member is uncompressed, and the one or more contact members are at or below the first surface;
   when a fuel unit is disposed in the hydrogen generator, the compressible member is compressed such that the one or more contact members extend beyond the first surface to make thermal contact with the fuel unit; and
   energy from the initiator assembly is conducted by the one or more contact members to corresponding one or more quantities of the exothermic mixture to initiate an exothermic reaction therein, thereby providing heat for the release of hydrogen gas from the hydrogen containing material.

2. The hydrogen generator according to claim 1, the hydrogen generator comprising a plurality of contact members, each corresponding to one or a group of a plurality of segregated quantities of the exothermic mixture.

3. The hydrogen generator according to claim 2, wherein an exothermic reaction in each one or group of the plurality of quantities of the exothermic mixture can be selectively initiated via the corresponding contact member.

4. The hydrogen generator according to claim 1, wherein the initiator assembly comprises one or more heating elements, each in thermal communication with at least one corresponding contact member such that the corresponding contact members conduct heat from one of the heating elements to the corresponding one or more quantities of the exothermic mixture.

5. The hydrogen generator according to claim 1, wherein the initiator assembly conducts electrical energy through the one or more contact members, each of which conducts electrical energy to one or more corresponding quantities of the exothermic mixture.

6. The hydrogen generator according to claim 1, wherein the fuel unit comprises a plurality of quantities of the exothermic mixture, each capable of providing heat for the release of hydrogen gas from a portion of the hydrogen containing material.

7. The hydrogen generator according to claim 6, wherein the portions of the hydrogen containing material are be segregated portions.

8. The hydrogen generator according to claim 7, wherein the segregated portions of the hydrogen containing material are be segregated by any one or a combination of a gap, a thermal insulator member and an electrical insulator member.

9. The hydrogen generator according to claim 6, wherein the exothermic reaction in individual or groups of quantities of the exothermic mixture can be selectively initiated to selectively provide energy to one or more conductor members, each of which conducts energy to one or more of the plurality of quantities of the exothermic mixture.

10. The hydrogen generator according to claim 1, wherein each of the contact members is a heating element.

11. The hydrogen generator according to claim 1, wherein each of the contact members has an elongated body.

12. The hydrogen generator according to claim 1, wherein each of the contact members has an end for contacting the fuel unit.

13. The hydrogen generator according to claim 12, wherein the end is a tapered tip.

14. The hydrogen generator according to claim 12, wherein the end can penetrate into the fuel unit.

15. The hydrogen generator according to claim 1, wherein energy is provided to the initiator assembly from an energy source.

16. The hydrogen generator according to claim 1, wherein the compressible member includes hydrogen flow channels in its first surface.

17. The hydrogen generator according to claim 1, wherein the access panel is moveable to provide access to the hydrogen generator for insertion and removal of the fuel unit.

18. A fuel cell battery and a hydrogen generator according to claim 1.

19. The hydrogen generator according to claim 18, wherein the fuel cell system includes a controller to selectively provide energy to one or more conductor members.

20. The hydrogen generator according to claim 19, wherein the controller can selectively provide energy to one or more conductor members based one or more parameters of the fuel unit, the hydrogen generator and a hydrogen consuming device.

* * * * *